United States Patent [19]

Soong et al.

[11] Patent Number: 5,031,684
[45] Date of Patent: Jul. 16, 1991

[54] VEHICLE WINDSHIELD SHADE

[76] Inventors: Jeanne F. Soong; Tsai C. Soong, both of 1839 Jackson Rd., Penfield, N.Y. 14526

[21] Appl. No.: 430,142
[22] Filed: Nov. 1, 1989
[51] Int. Cl.⁵ ................................................ E06B 3/80
[52] U.S. Cl. .............................. 160/370.2; 160/368.1; 296/98.8
[58] Field of Search .......................... 160/370.2, 368.1; 296/97.8, 97.9

[56] References Cited

U.S. PATENT DOCUMENTS

| | | | |
|---|---|---|---|
| 2,711,923 | 6/1955 | Parks | 160/370.2 X |
| 2,972,377 | 2/1961 | Jacobs | 160/370.2 X |
| 3,279,845 | 10/1966 | Lutz | 160/370.2 X |
| 4,736,980 | 4/1988 | Eubanks | 160/370.2 X |
| 4,790,571 | 12/1988 | Miller | 160/370.2 |
| 4,893,668 | 1/1990 | Nomara | 160/370.2 X |

Primary Examiner—Blair M. Johnson
Attorney, Agent, or Firm—Bernard A. Chiama

[57] ABSTRACT

A windshield blind or shade adaptable for application to any of the window areas of a vehicle is disclosed as being made of flexible insulative fabric material having at least one suction cup adjacent each side edge for attachment to the surface of a window. A slidable shaft connects the cup to an edge of the shade for permitting the selective positioning of the suction cups, thereby enabling variation of positioning of the cups and the application of the shade to different sizes of windows. Another embodiment utilizes two suction cups associated with each side edge of the shade with a cup adjacent each corner thereof. Another embodiment involves a shade made of stiff paper stock or the like having at least one horizontal fold line and a plurality of vertical fold lines thus enabling double folding of the shade into a compact package.

2 Claims, 5 Drawing Sheets

VEHICLE WINDSHIELD SHADE

BACKGROUND OF THE INVENTION

The present invention is directed to windshield blinds or shades and, more particularly, to mountable sun blocking devices which may be quickly applied to and removed from a vehicle windshield for protecting the interior of the vehicle against the effects of sun's rays.

There are varieties of types of blinds or shades for automobile windshields and different means of fastening the same to a windshield or other window of a vehicle. The present invention is directed to easily removable, foldable and novel blind or shade devices to shut out heat produced by sunlight radiation with respect to windshield, side windows and the rear window of automobiles, sports vehicles, pleasure boats and small airplane cockpits when they are parked or moored in open space under the hot sun for hours and heat has accumulated inside the airtight passenger compartment associated with these vehicles.

With respect to motor vehicles, there is prior art including pull-down blinds for limousines, vans and camping vehicles, folding paper carton boards adapted for positioning on vehicle dashboards to shut out the sun rays during parking, etc. These devices may be permanently or semi-permanently installed like pull-down blinds. However, these devices are relatively flimsy, difficult to mount and have a short life span. There is no prior art which discloses windshield devices adapted for use in limited space, such as over a windshield of an automobile; to be repeatedly put on and taken off; to remain neat and flat when fully expanded; and adapted for easy storage.

From a user's point of view, there is need to have a removable blind or shade usable in cars, boats and airplanes, etc., which satisfies the following performance criteria: (1) the blind covers nearly the entire window area and shuts out most of the heat produced by the sun, (2) the blind is adapted to be applied in seconds, or less than a minute and removed by a one person without the aid of tools, (3) the blind does not leave any marks, dirt or trace on the wall or surface after repeated use of the blind, (4) the blind is rollable, foldable, or collapsible and does not need an overly amount of space for storage, (5) it maintains suitable tension while applied to a windshield, hence can remain flat, neat, adhering closely to the windshield, thereby remaining appealing to the eye at all times without being affected by gravitational force, and 6) the blind material is inexpensive but is effective as thermal insulation. Even though all of these criteria are relative, they cannot be expressed in absolute terms with respect to the degree of satisfaction, whereby violation of any criterion would be instantly obvious to the user who utilizes such a device.

Therefore, it is the principal object of the present invention to enhance windshield shades or blinds by devising the same to be completely collapsible, such as being rollable or foldable along horizontal lines as well as along vertical lines.

Another object of the present invention is to improve windshield shades to include specifically positioned fastening devices whereby the shades are adapted to remain flat and adhere more firmly to a windshield, or the like.

Still another object of the invention is to devise a windshield shade which may be quickly applied to a windshield and in a manner wherein the windshield is completely covered.

In order to avoid the problems and disdvantages discussed above, the present invention has been devised as a shade of approximately rectangular or trapezoidal shape, dimensioned according to the size of the host windshield to be covered. The material is preferably of insulated fabric, thick paper card stock, or a combination of paper, fabric, synthetics, foams, insulation sheets and other conventional heat reflective and insulative materials, layered or interwoven with each other. When it is not in use, the shade can be rolled as in the rolling of a blanket, or folded snugly into a coil, or zig-zagedly folded one panel after another as an accordion, in the length direction, so that its length of five feet or more is reduced to a roll or a solid rectangular deck of only two or three inches in size for easy storage. In the preferred embodiment and in other modifications thereof, the blind includes means for positively fastening each end of the blind to the host windshield which will enable the blind to remain flat and fully applied to the windshield.

These and other objects of the invention will become apparent after reading the following description taken in conjunction with accompanying drawings wherein:

DESCRIPTION OF THE PREFERRED EMBODIMENT

Figure 1:
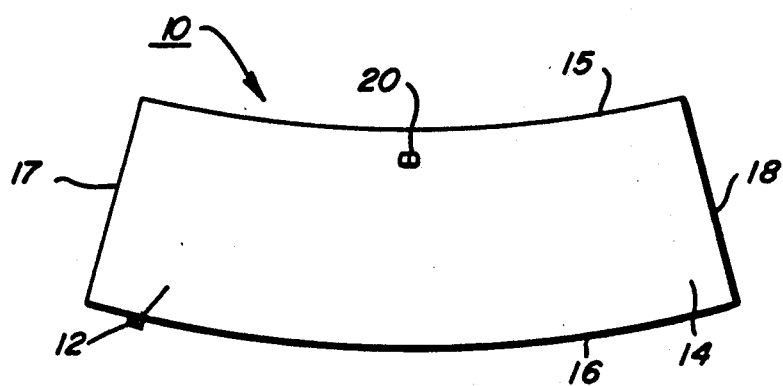
FIG. 1 illustrates a typical vehicle windshield as being narrow at the top and wider along the bottom and being formed with a rear vision mirror mounting stem along the upper curved edge thereof.

A typical vehicle windshield 10, as shown in FIG. 1, is viewed from the front seat of a host vehicle and comprises the driver side 12 and the front passenger side 14, the windshield being formed with top and bottom edges 15, 16, respectively, curved as to suit the contour of the vehicle and side edges 17, 18. A rear view mirror mounting stem 20 is shown in relation to the upper edge 15 of the windshield.

A preferred embodiment of the windshield blind or shade devised in accordance with the invention is shown in FIGS. 2-5. The windshield shade 24, preferably made of fabric, includes a sliding suction cup unit adjacent each corner thereof, each of the units including a suction cup 26, 28, 30, 32 arranged to slide upon a relatively rigid shaft 34, 36, 38, 40, respectively, made of metal, plastic or other suitable material. The unit is devised so that the cups 26, 28, 30, 32 may move or stay on any position along their respective shafts, by friction or any simple device, including mechanical, such as a set screw. In this manner, when either of the suction cups is sucked onto the glass surface of a window, the respective shaft cannot be moved relative to the accumulated suction cup as will be detailed below.

Figure 3:
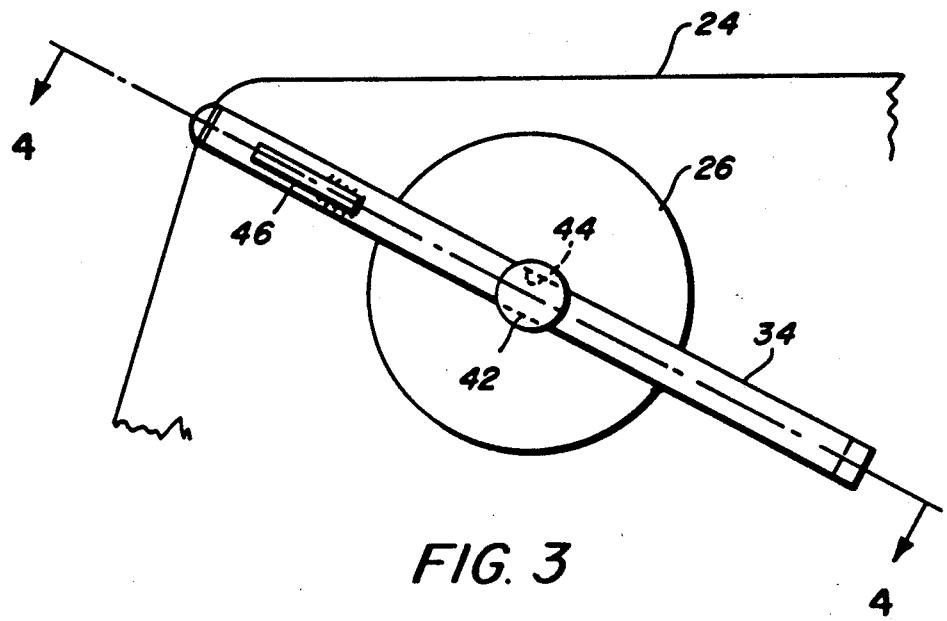
FIG. 3 is a fragmentary view of a suction cup unit used in the invention.
Figure 4:
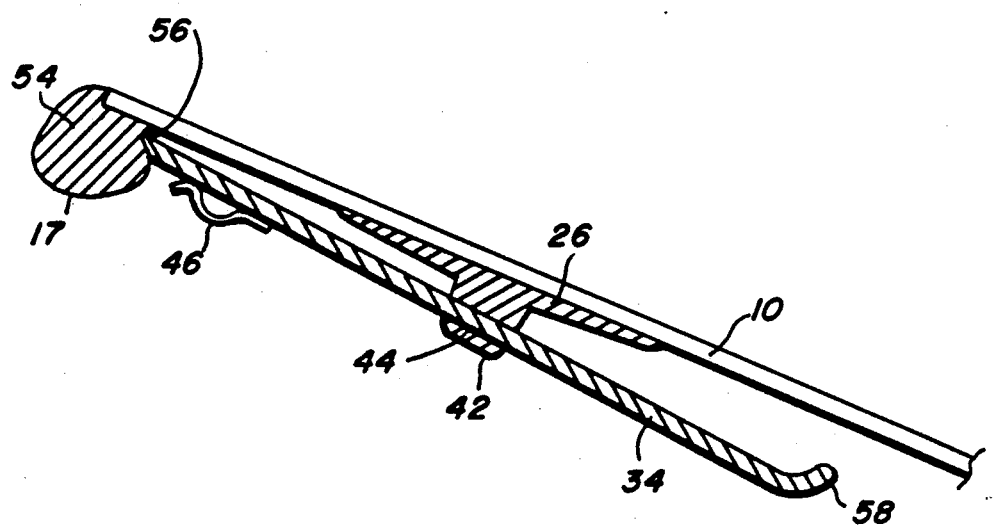
FIG. 4 is a cross-section view taken along lines 4—4 in FIG. 3.
Figure 6:
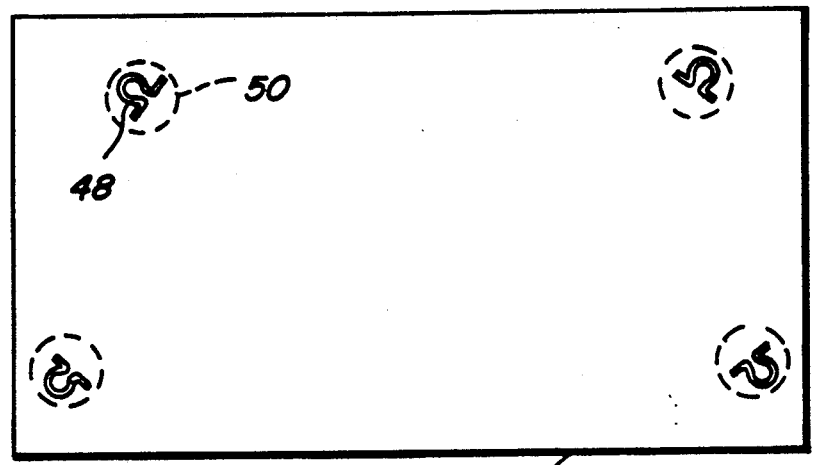
FIG. 6 is an elevational view of the shade showing loop elements applied thereto.

Since each of the suction cups and associated shaft and attendant structure is identical, only one arrangement, namely the cup unit comprising the cup 26 thereof, will be described in detail. As shown in FIGS. 3 and 4, the cup 26 is fastened to the surface of the window 10 by suction. The suction cup 26 is preferably of conventional construction found in any hardware store as comprising a center stem 42 having a transverse hole 44 formed therein which is usually utilized for attaching a hook or the like. In the present invention, the shaft 34 slidably projects through the hole 44 being adjustably relative to the stem 42, and although a set screw (not shown) may be used to lock the shaft to the stem, it is preferred that adjustable locking be available by friction fit between the shaft and the stem.

The outer end for the shaft 34 has a resilient hook 46 secured thereto for engagement with a plastic or metallic ring or loop element 48 fastened adjacent a corner of the shade 24 on the side thereof facing the interior of the host vehicle. A backing member 50, to which the ring or loop element is attached, is secured to the opposite side of the shade in order to reinforce the fabric of the shade. Preferably, the loop element 48 is made of plastic but may also be made of fabric such as string or rope. During installation of the shade, the hook 46 is inserted into the loop and allowed to become snapped in locking attachment by the resiliency of the hook. In this manner, the loop 48 may be easily attached to and detached from the hook 46 to effect mounting and dismounting of the shade 24.

When all four corners of the shade 24 are hung on the four hooks 46 of the respective sliding suction cup units, the shade will completely cover the windshield from the sun's rays. In this arrangement, the hook is made movable with respect to the associated suction cup by means of the appropriate shaft so that the suction cup may be placed on a selected attaching point on the surface of the windshield to avoid stickers 52 or dirt and to achieve a firm suction onto the surface. In addition, the extendable shaft enables the hook 46 to reach a point outside the boundaries of the windshield so that the shade can enclose the windshield more completely, which achieves a better insulation or shielding purpose than merely covering the glass area itself.

In order to install or mount the shade 24, the installer need only extend a shaft 34 with a hook 46 attached to a loop 48 toward the desired corner of the windshield and press down on the suction cup. The friction fit between the shaft and the appropriate stem 42, or in the alternative, a conventional set screw (not shown) will maintain the shaft in the extended position to hold the corner of the shade, to which that suction cup and shaft are associated, to the desired corner of the windshield. In a reverse process, the suction cup with the shaft may be placed on the appropriate position of the corner of the windshield and the loop is then put onto the hook at the end of the shaft. In some vehicles, the windshield includes a side frame 54 into which the extreme tip of a shaft 34 may be inserted and be wedged therein. With the tip of the shaft so wedged and the suction cup further along the shaft, the position of a hook 46 is in between these two supporting points. The weight of the shade acting on the hook is then shared by the reactions from the end of the shaft and from the suction cup thereby enhancing the mounting of the shade.

As shown in FIG. 4, the shaft 34 is formed with an inner bent tip 58 which bends toward the windshield 10 so that is may reach the same when the shaft 34 is tilted by the weight of the shade. This will cause the shaft to rotate about the suction cup as a point, and the weight of the shade is supported by the cup and the support of the bent tip 58. Other means may be employed for attaching a corner of the shade 24 to a shaft 34, other than the hook 46 and loop element 48. For example, Velcro pads or a tie of a knot of a string may be used. Rather than by friction fit or a set screw, the shaft may be adjustably positioned on a stem 42 by the use of holes formed in the shaft so that the stem can be selectively inserted in any of the holes. In a similar way, hook element 46 may also be mounted on a sliding sleeve which slides on shaft 34 with frictional fit to seek the best coverage of the blind with relation to the corner.

Figure 7:
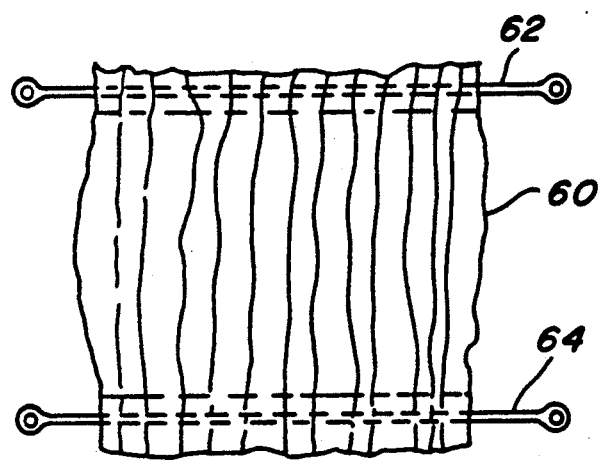
FIG. 7 is an elevational view of another embodiment of the shade.

Another embodiment of the windshield shade is shown in FIG. 7 wherein a shade 60 is provided with a string 62 threaded through folds of the shade along the upper edge and a string 64 threaded through the folds of the lower edge thereof. Each of the strings 62, 64 terminates in a ring 66 which is adapted to be attached to the hooks 46 when the suction cups 26, 28, 30, 32 have been attached to a window. The strings 62, 64 may be elastic and are arranged to slide relative to the shade 60.

In still another embodiment, a windshield shade may combine some of the features of the embodiment of FIGS. 2–6 with those in the embodiment of FIG. 7. For example, the lower string 64 in the embodiment of FIG. 7 may be replaced with suction cup units which include the cups 36 and 40 along the lower edge of the shade. In still another alternative, the lower string 64 may be dispensed with and no suction cups be utilized along the lower edge of the shade. In this arrangement, the shade will hang down vertically and not be controlled at its lower edge.

Figure 8A:
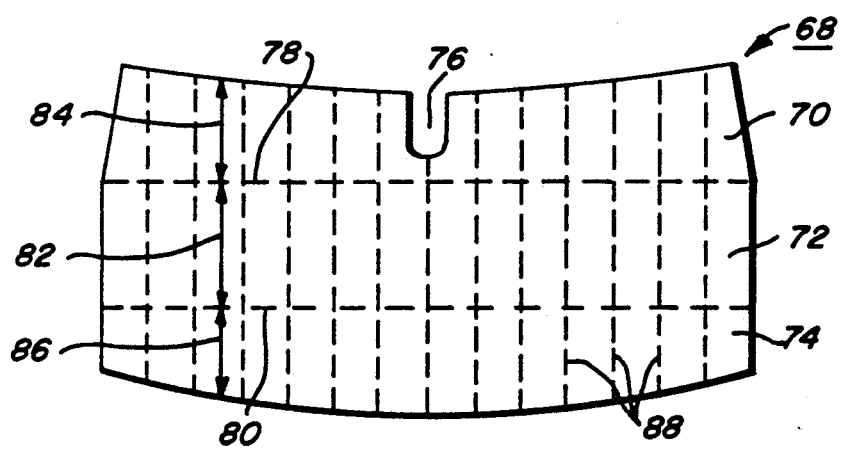
FIG. 8a illustrates a windshield blind or shade devised in accordance with another embodiment of the invention as having two series of fold lines.
Figure 8B:
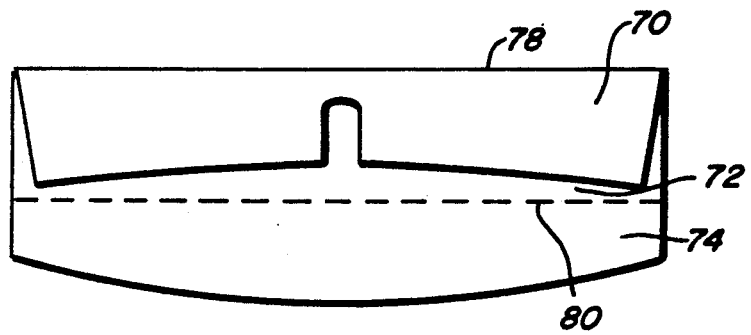
FIG. 8b shows the shade with the upper panel being folded upon a middle panel.
Figure 8C:
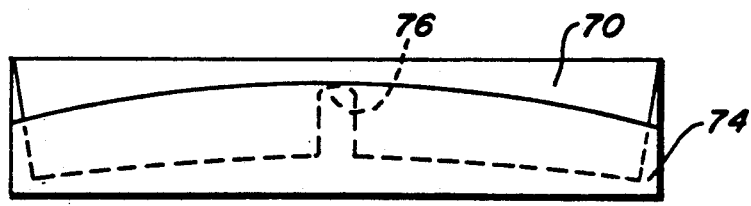
FIG. 8c shows the lower panel of the shade being folded onto the upper panel.
Figure 2:
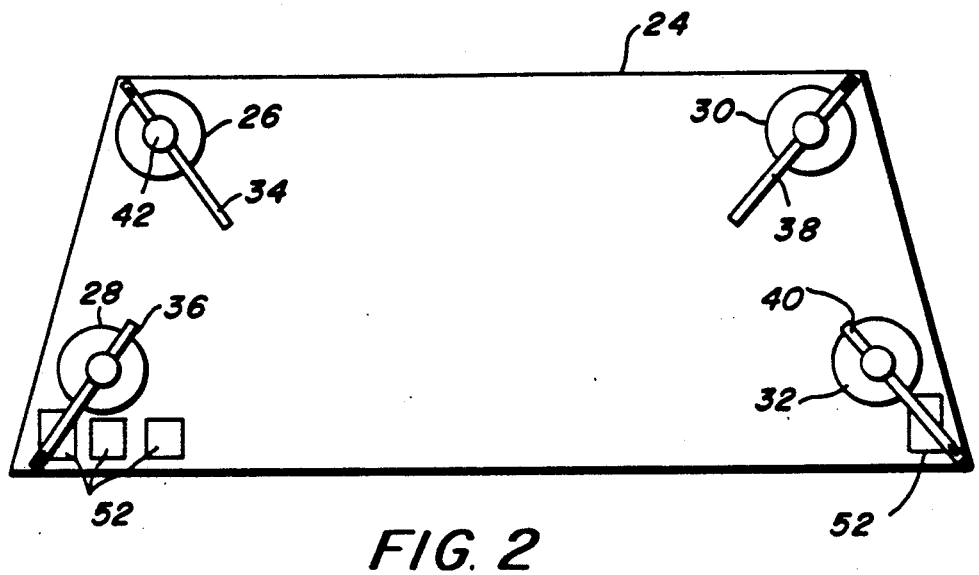
FIG. 2 is an elevational view of a preferred arrangement of a shade devised in accordance with the present invention.
Figure 5:
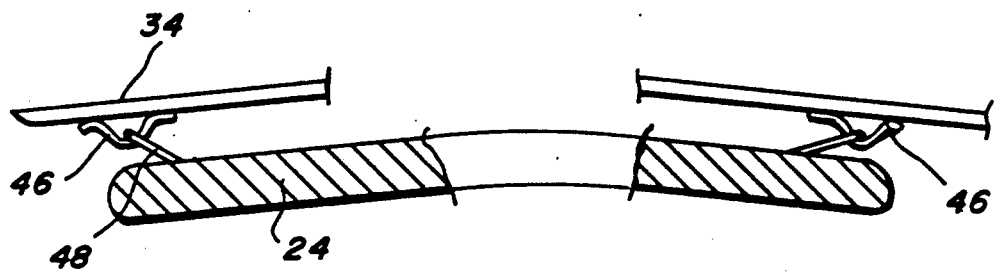
FIG. 5 is a fragmentary end view of the shade.

Another embodiment of the windshield blind or shade devised in accordance with the invention is indicated in FIGS. 8a, 8b and 8c by the reference numeral 68, and in various progressive stages of folding. The windshield shade 68 comprises three main panels: the upper panel 70, the middle panel 72, and the lower panel 74. The top edge of the upper panel centrally thereof is formed with a curved cut-out 76 arranged to receive the stem 20.

As shown in FIG. 8a, the shade 68 has a dotted upper fold line 78 and a lower fold line 80 with the height 82 between these fold lines being greater than the maximum height 84 of the upper panel 70 and the maximum height 86 of the lower panel 74. The shade 68 is also formed with vertical lines 88, as shown in FIGS. 8a, which permits the user to fold the shade from one longitudinal, horizontal end to the other, thereby enabling compaction of the shade into a small size for easy handling and storage.

Figures 9, 10:
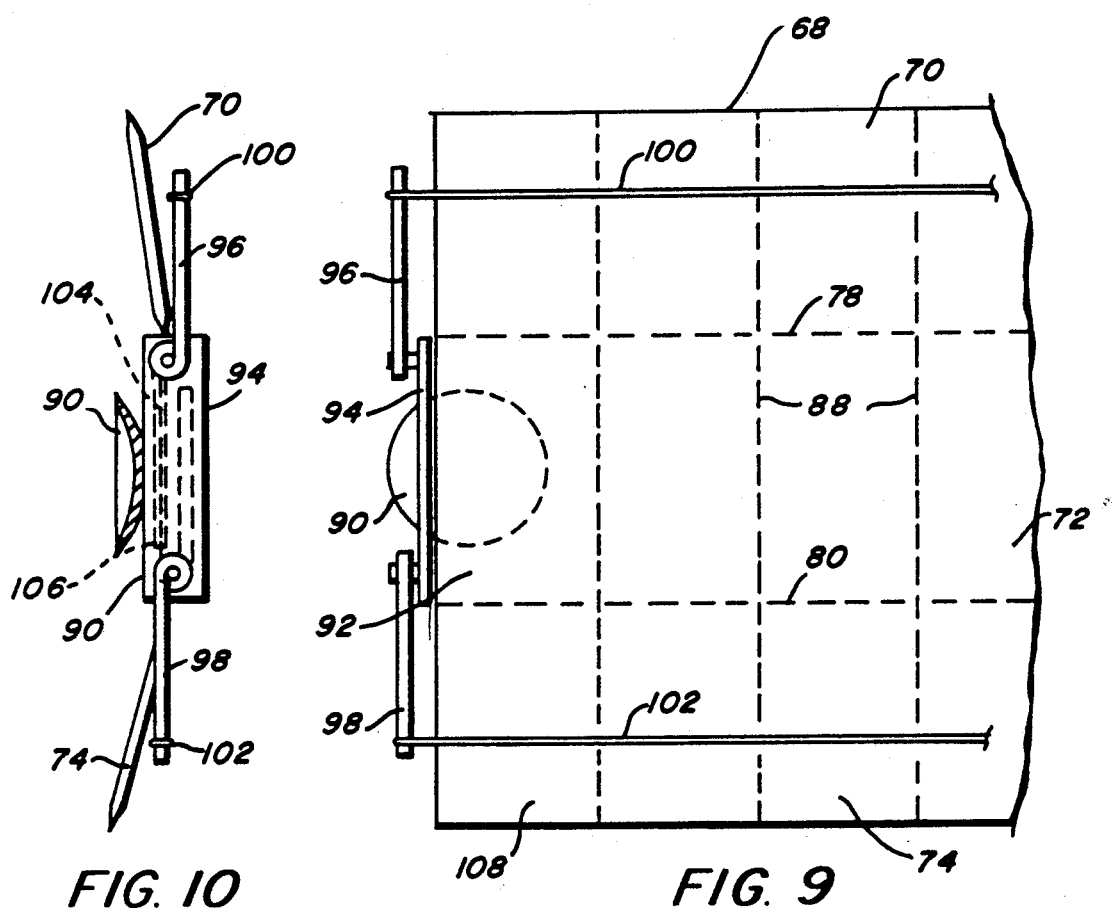
FIG. 9 illustrates one end of the shade and a suction cup mechanism applied thereto.
FIG. 10 is an end view of the shade shown in FIG. 9.

In order to hold the shade against a window, such as a windshield, side window or rear window, various attaching devices are hereby described which permit easy attachment and detachment of the shade relative to the host window. Preferably, the attachment utilizes a suction cup unit, generally indicated by the reference numeral 90, as shown in FIGS. 9 and 10, at each end of the windshield shade 68. For purposes of simplicity, only one end of the shade 68 is shown and will be described.

In the embodiment of FIGS. 9 and 10, the shade 68 shown comprising upper panel 70 foldable downwardly along the horizontal fold line 78 upon the middle panel 72 and the lower panel 74 foldable upwardly along the horizontal fold line 80. The suction cup 90 is secured to a bracket plate 92 having an upturned flange 94 turned toward the interior of the host vehicle. A first hinge pin 96 is pivotally attached on the upper end of the flange 94 and a second hinge pin 98 is pivotally attached to the lower end of the flange. A string or an elastic band 100 is secured at one end to the outer end of the pin 96 and extends across the entire length of the upper panel 70 to a similar located hinge pin to which the other end of the string is attached. Similarly, a lower positioned string 102 is connected to the outer end of the pin 98 and extends across the length of the lower panel 74 to a hinge pin located at the other end of the shade to which the string is attached.

Each of the strings or bands 100, 102, when in the positions shown in FIG. 9, serves to maintain their respective panels 70, 74 against the windshield of the host vehicle, and with flaps which comprise each of the panels flattened out. When dismounting the shade from the position shown, the vehicle operator rotates the two hinge pins 96 downwardly so that the same occupy the space adjacent the flange 94 indicated by the dotted lines 104. This operation places the string 100 out of the way and against the middle panel 72. In like manner, the hinge pins 98 are rotated upwardly so that they occupy the space indicated by the dotted lines 106 so that the string 102 is moved out of contact with the lower panel and placed in an inoperative position against the middle panel. The upper panel is then folded down against the middle panel and the lower panel is folded up against the now folded upper panel, as shown in FIG. 8c.

In completing the dismounting of the shade 68, the operator removes each of the suction cups 90, preferably starting with the cup located on the passenger side of the windshield. By detaching the right side cup first, this being further away, there is better control in collapsing the shade in fan-fold zigzig fashion along vertical lines 88 so as to compress the shade toward the left side suction cup 90. Upon this occurrence, the left side cup is detached from the windshield, leaving a fully compacted shade which may be wrapped and bound by the strings 100, 102.

In the folding sequence of the vertical fold lines 88, it is preferred that they be arranged so that the first fold line adjacent the suction cups 90 depicts a cusp which points toward the window end with the last fold panels 108 having the brackets 92 for the suction cups permanently attached thereto. The fold lines 88 are then arranged alternately with cusps pointing toward the window and cusps pointing toward the driver. In pushing the accordian type panels from right to left, the panels follow their natural tendency to curl up.

While the brackets 92 are preferably made of metallic material, they may also be made from other relatively stiff material. It should be rigid so that some tension force can be expected on it by the expanded folding panels without distortion. The suction cups 90 are designed so that the brackets press down upon the window surface to reduce the space between the same and the shade. The strings 100, 102 may be tied on one of the hinge pins 96, 98, respectively, and looped upon the corresponding pin on the opposite end of the shade. Each of the strings may be provided with a small spring or be made of elastic material so as to maintain their tightness capable of supporting their respective horizontal panels without undue sagging in the middle.

Figure 11:
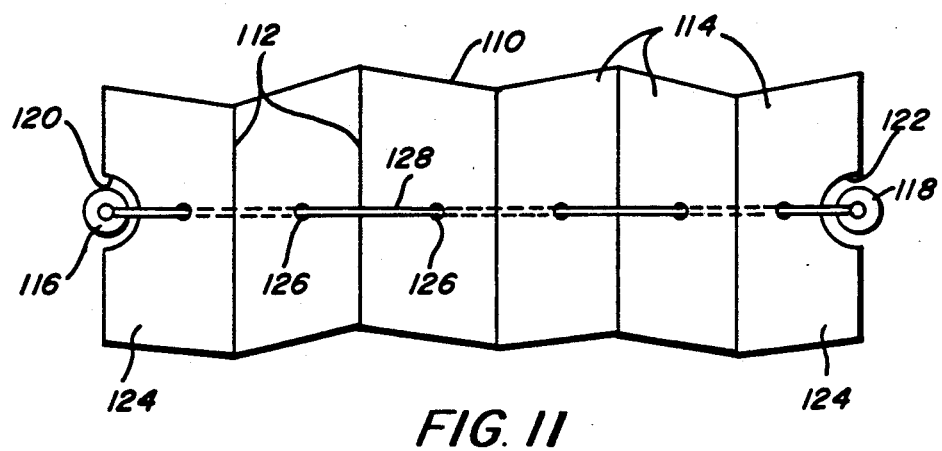
FIG. 11 is a plan view of a modification of the shade.

A simple embodiment of the invention of FIGS. 8-10 is illustrated in FIG. 11 wherein a shade 110 is shown with vertical alternating fold lines 112 separating vertical panels 114. The shade is arranged in cooperative relationship with suction cups 116, 118, one positioned adjacent each end of the shade within cutouts 120, 122, respectively, formed in the end panels 124. Each of the panels 114, 124 is formed with openings 126 through which a string or elastic band 128 is threaded, the ends of the string or band being tied to and stretched between the suction cups 116, 118. In this embodiment, with the cups applied to a window, the panels 114 will support each other for stability, and the string or band will press the blind against the window. If the shade has a short height two or more such shades may be utilized to cover the window. In the alternative, if a large shade is utilized, a shade with a large height may utilize several strings or bands with corresponding pairs of suction cups arranged in accordance with FIG. 11.

From the foregoing, it will be appreciated that the present invention provides novel arrangements for protection against the sun's rays impinging and projecting through the windows of a vehicle. The invention takes a variety of forms or embodiments, the preferred being illustrated in FIGS. 2-6. In this embodiment, four suction cup units are illustrated with one unit being associated with each corner of a generally rectangular or trapezoidal shaped shade. For a more economical arrangement and in the broadest concept of the invention, a single suction cup unit, as described in the foregoing, may be utilized as associated adjacent each side edge of a shade instead of two units adjacent the side edges, as described in FIGS. 2-6.

While the preferred embodiment of the various aspects of the invention has been described using specific terms and arrangements, such descriptions are for illustrative purposes only, and it is to be understood that changes or variations may be made without departing from the scope of the following claims.

What is claimed is:

1. A device for application to one or more windows of a vehicle for blocking sun rays from entering the vehicle comprising: a shade made from material impervious to sun rays and adapted for mounting across a vehicle window, having upper and lower edges and side edges cooresponding to upper and lower edges and side edges of the window, respectively, said shade including at least one fastening device operatively associated with each of said sides edges thereof, each of said fastening devices adapted to be detachably mounted upon the surface of the window, means mounted adjacent each of said side edges of said shade for detachably securing said fastening devices to each of said sides edges, respectively, said fastening devices are suction cups with sliding shafts with hook elements.

2. A device for application to a window of a vehicle for blocking sun rays from entering therethrough comprising: a shade having one or more reflective surfaces and adapted for mounting on the vehicle window, having upper and lower edges and side edges corresponding to upper and lower edges and the side edges and side edges of the window, respectively, said shade including at least one fastening device operatively associated with at least one of said edges, said fastening device adapted to be detachably mounted upon the surface of the window, and means mounted adjacent said at least one of said edges for detachably securing said fastening device thereto, said fastening device including a suction cup with at least one extended shaft with a hook element.

* * * * *